United States Patent
Hohne et al.

(10) Patent No.: US 11,539,666 B2
(45) Date of Patent: Dec. 27, 2022

(54) METHOD AND APPARATUS FOR SECURE COMMUNICATION AND ROUTING

(71) Applicant: Vertex Aerospace LLC, Hewitt, TX (US)

(72) Inventors: Charles C. Hohne, Carmel, IN (US); Todd A. Swails, Greenwood, IN (US); Christopher J. Nord, Indianapolis, IN (US); Christopher J. Pulling, Fishers, IN (US); Kristi Irgens, Breckenridge, CO (US); Howard Turner, McCordsville, IN (US); Ian A. Knopf, Indianapolis, IN (US); Vincent A. Maglio, Fishers, IN (US); Kyle A. Brown, Fishers, IN (US)

(73) Assignee: Vertex Aerospace LLC, Madison, MS (US)

( * ) Notice: Subject to any disclaimer, the term of this patent is extended or adjusted under 35 U.S.C. 154(b) by 165 days.

(21) Appl. No.: 16/910,898

(22) Filed: Jun. 24, 2020

(65) Prior Publication Data

US 2021/0409377 A1 Dec. 30, 2021

(51) Int. Cl.
| | |
|---|---|
| H04L 9/40 | (2022.01) |
| H04W 12/06 | (2021.01) |
| G06F 9/455 | (2018.01) |
| H04W 12/037 | (2021.01) |
| H04W 12/088 | (2021.01) |
| H04W 12/121 | (2021.01) |

(52) U.S. Cl.
CPC ...... *H04L 63/0272* (2013.01); *G06F 9/45558* (2013.01); *H04W 12/037* (2021.01); *H04W 12/06* (2013.01); *H04W 12/088* (2021.01); *H04W 12/121* (2021.01); *G06F 2009/45583* (2013.01); *G06F 2009/45595* (2013.01)

(58) Field of Classification Search
CPC .............. H04L 63/0272; H04W 12/06; H04W 12/121; H04W 12/037; H04W 12/088; G06F 9/45558; G06F 2009/45583; G06F 2009/45595
See application file for complete search history.

(56) References Cited

U.S. PATENT DOCUMENTS

| | | | | |
|---|---|---|---|---|
| 2007/0189308 | A1* | 8/2007 | Tchigevsky | G06F 21/53 370/396 |
| 2020/0310972 | A1* | 10/2020 | Shanbhogue | H04L 9/32 |
| 2021/0344651 | A1* | 11/2021 | Joshi | H04L 12/4641 |

* cited by examiner

*Primary Examiner* — Ashokkumar B Patel
*Assistant Examiner* — William B Jones
(74) *Attorney, Agent, or Firm* — Jones Day

(57) ABSTRACT

An apparatus is provided, comprising: a volatile memory; a non-volatile memory; a first electronic circuit that is configured to operate as a wireless access point, the first electronic circuit including a wireless controller for accessing a wireless network; and a second electronic circuit that is operatively coupled to the first electronic circuit, the second electronic circuit including at least one processor configured to execute: (i) a first virtual machine that includes a wireless network authentication server, and (ii) a second virtual machine that includes a virtual private network (VPN) server, wherein the wireless network authentication server is configured to authenticate devices that attempt to join the wireless network; wherein the VPN server is arranged to encrypt data that is received at the apparatus to produce encrypted data, and forward the encrypted data to the wireless controller for transmission over the wireless network.

14 Claims, 7 Drawing Sheets

METHOD AND APPARATUS FOR SECURE COMMUNICATION AND ROUTING

STATEMENT REGARDING FEDERALLY SPONSORED RESEARCH

This invention was made with government support under W58RGZ-15-D-0003 awarded by the United States of America Department of Defense. The government has certain rights in the invention.

BACKGROUND

A wireless network is a type of telecommunications network that uses radio communications to transmit data. Wireless networks are frequently connected to wired networks and used to access information stored in the wired networks. Wireless networks are inherently more vulnerable to attacks than wired networks, as they are accessible to anyone within range. This property of wireless networks makes them suitable staging grounds for attacks on connected wired networks. The provision of adequate security mechanisms in wireless networks is thus necessary to ensure safe and reliable operation of the wireless networks, as well as any connected wired networks.

SUMMARY

According to aspects of the disclosure, an apparatus is provided, comprising: a volatile memory; a non-volatile memory; a first electronic circuit that is configured to operate as a wireless access point, the first electronic circuit including a wireless controller for accessing a wireless network; and a second electronic circuit that is operatively coupled to the first electronic circuit, the second electronic circuit including at least one processor configured to execute: (i) a first virtual machine that includes a wireless network authentication server, and (ii) a second virtual machine that includes a virtual private network (VPN) server, wherein the wireless network authentication server is configured to authenticate devices that attempt to join the wireless network; wherein the VPN server is arranged to encrypt data that is received at the apparatus to produce encrypted data, and forward the encrypted data to the wireless controller for transmission over the wireless network, and wherein at least one of the first virtual machine or the second virtual machine is fully contained in the volatile memory.

According to aspects of the disclosure, an apparatus is provided, comprising: a non-volatile memory; a volatile memory; a first electronic circuit that is that is configured to operate as a wireless access point, the first electronic circuit including a wireless controller for accessing a wireless network; and a second electronic circuit that is operatively coupled to the first electronic circuit, the second electronic circuit including at least one processor configured to execute: (i) a first virtual machine that includes a virtual private network (VPN) server, and (ii) a second virtual machine that includes a first firewall, wherein the VPN server is configured to: encrypt data that is received at the apparatus to produce encrypted data, and forward the encrypted data to the wireless controller for transmission over the wireless network, and wherein each of the first virtual machine and the second virtual machine is fully contained in the volatile memory.

According to aspects of the disclosure, a method is provided for use in an electronic device that includes a first electronic circuit configured to operate as an access point for accessing a wireless network and a second electronic circuit having a volatile memory and at least one processor, the method comprising: instantiating a random-access memory (RAM) disk in the volatile memory of the second electronic circuit; partitioning the RAM disk into a plurality of partitions; launching a first virtual machine on the second electronic circuit, the first virtual machine being launched in a first partition of the RAM disk, the first virtual machine including a wireless network authentication server that is configured to authenticate devices that attempt to join the wireless network via the first electronic circuit; and launching a second virtual machine on the second electronic circuit, the second virtual machine being launched in a second partition of the RAM disk, the second virtual machine including a virtual private network (VPN) server that is configured to encrypt data that is received at the apparatus to produce encrypted data, and forward the encrypted data to the first electronic circuit for transmission over the wireless network, wherein the first virtual machine and the second virtual machine are fully contained in the volatile memory of the second electronic circuit.

BRIEF DESCRIPTION OF THE DRAWINGS

The foregoing features may be more fully understood from the following description of the drawings in which.

DETAILED DESCRIPTION

Figure 1:
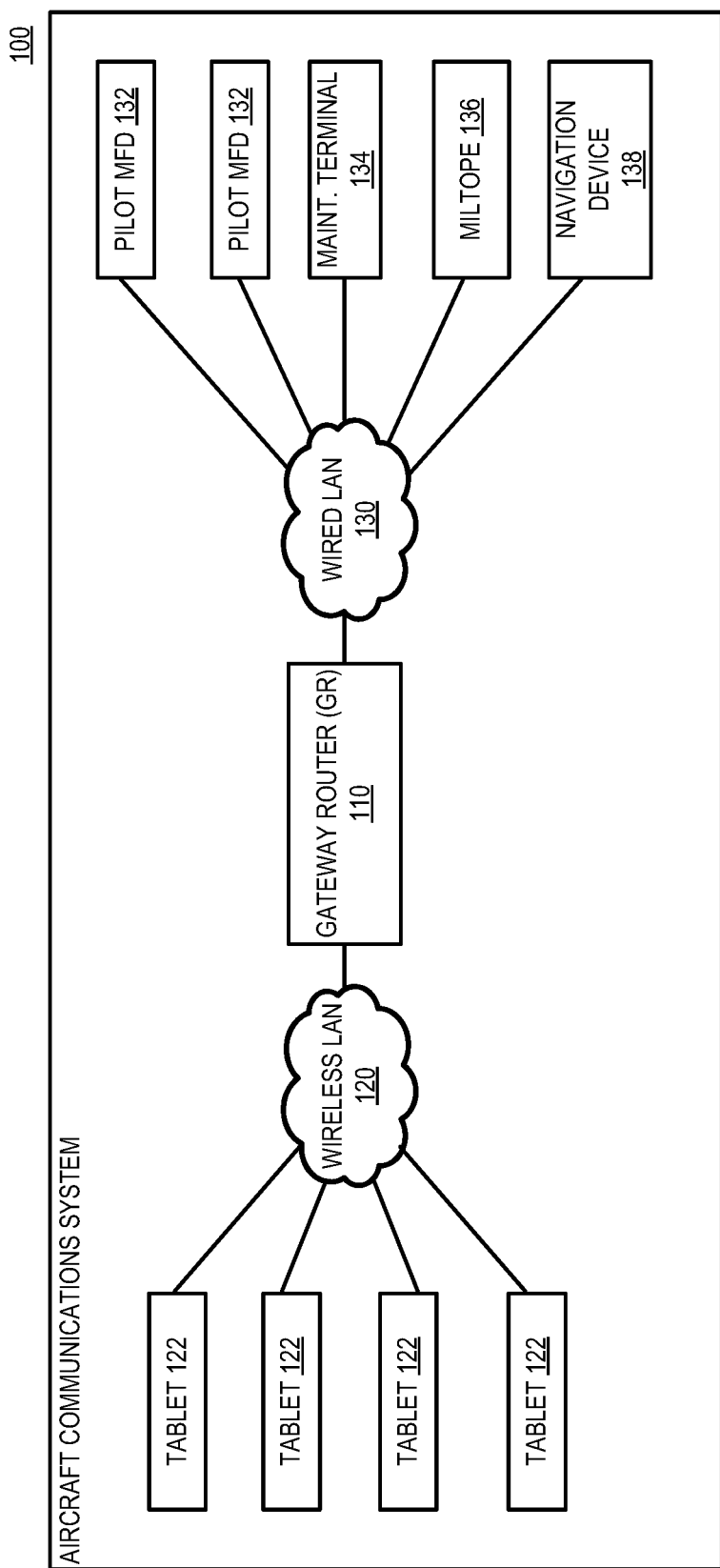
FIG. 1 is a schematic diagram of an example of a communications system, according to aspects of the disclosure.

FIG. 1 is a diagram of an example of a communications system 100, according to aspects of the disclosure. The communications system 100 may be deployed aboard an aircraft and/or ground vehicles, and it can be used for the exchange of data between the pilots, personnel on board the aircraft, and ground personnel. The communications system 100 may include a gateway router (GR) 110, a wireless network 120, and a wired network 130. The wireless network 120 may include an 802.11 network (e.g., a WiFi network), a Long-Term Evolution (LTE) network, a 5G network, and/or any other suitable type of network. The wired network 130 may include a local area network (LAN), a wide area network (WAN), an Ethernet network, an Infiniband network, the Internet, and/or any other suitable type of communications network. A plurality of tablets 122 may be connected to the wireless network. The wired network, on the other hand, may be connected to one or more multifunction displays (MFDs) 132, a maintenance terminal 134, a Miltope™ computing system 136, and a navigation device 138. In some implementations, the GR 110 may be used by the tablets 122 as an access point for connecting to the wireless network 120. Additionally or alternatively, in some implementations, the GR 110 may be arranged to operate as a bridge between the wireless network 120 and the wired network 130, thus allowing data to be exchanged between any of the devices 132-138 and any of the tablets 122.

Figure 2:
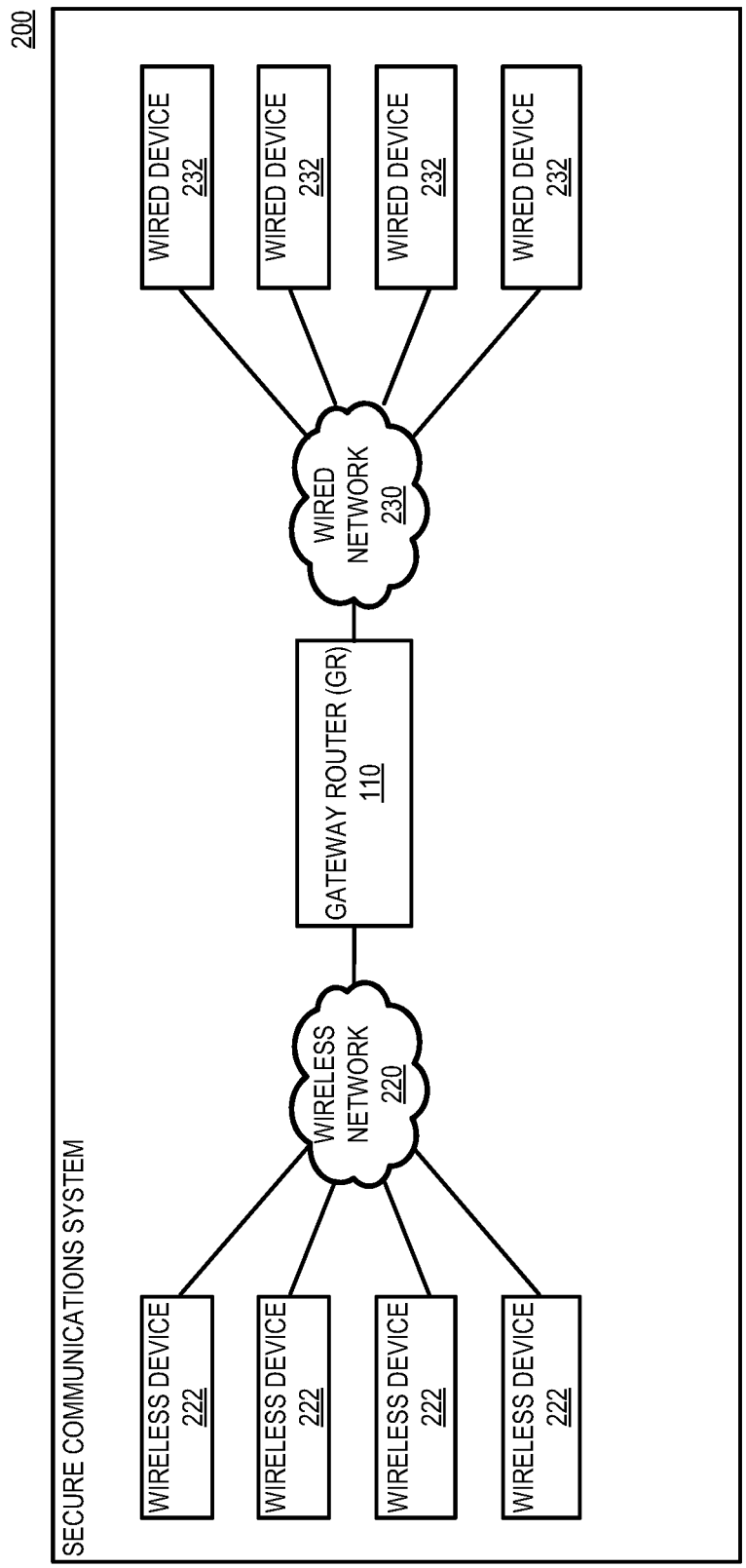
FIG. 2 is a schematic diagram of an example of a communications system, according to aspects of the disclosure.

FIG. 2 illustrates another example of a communications system where the GR 110 can be deployed. Shown in FIG. 2 is a communications system 200 including a wireless network 220 that is coupled to a wired network 230 via the GR 110. The wireless network 220 may include an 802.11 network (e.g., a WiFi network), a Long-Term Evolution (LTE) network, a 5G network, and/or any other suitable type of network. The wired network 230 may include a local area network (LAN), a wide area network (WAN), an Ethernet network, an Infiniband network, the Internet, and/or any other suitable type of communications network. A plurality of wireless devices 222 may be connected to the wireless network 220, and a plurality of wired devices 232 may be coupled to the wired network 230. Each of the wireless devices 222 may include a smartphone, a tablet, a laptop, and/or any other device that includes an interface for connecting to the wireless network 220. Each of the wired devices 232 may include a desktop computer, a laptop, a server, and/or any other suitable type of device that includes an interface for connecting to the wired network 230. As noted above, the GR 110 may be arranged to operate as an access point for connecting to the wireless network 220 and/or a bridge between the wireless network 220 and the wired network 230. The operation of the GR 110 is discussed further below with respect to FIGS. 3-7.

Figure 3:
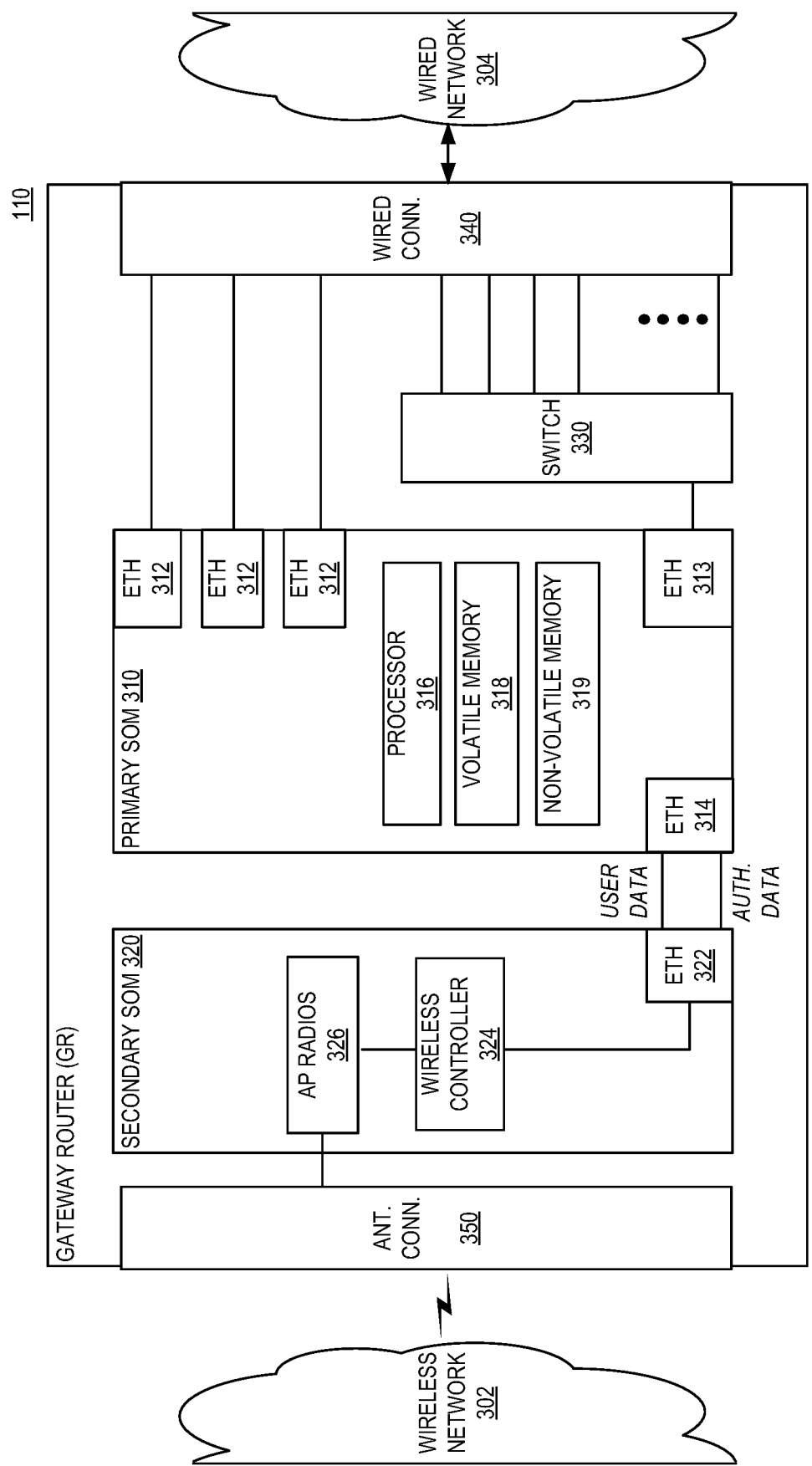
FIG. 3 is a schematic diagram of an example of a gateway router (GR), according to aspects of the disclosure.

FIG. 3 is a diagram of the GR 110, according to aspects of the disclosure. The GR 110 may be coupled to a wireless network 302 and a wired network 304. In operation, the GR 110 may be configured to operate as an access point for connecting client devices to the wireless network 302, as well as a bridge for connecting the wireless network 302 to the wired network 304. The GR 110 may include a primary system-on-a-module (SOM) 310 and a secondary SOM 320 that is coupled to the primary SOM 310. The primary SOM 310 may be coupled to a switch 330 and one or more data connectors 340. The secondary SOM 320 may be coupled to one or more antenna connectors 350. In operation, the GR 110 may receive data, from the wired network 304, on any of the data connectors 340 and route the received data to any of the antenna connectors 350 for transmission over the wireless network 302. Similarly, the GR 110 may receive data, from the wireless network 302, on any of the antenna connectors 350 and route the received data to any of the data connectors 340 for transmission over the wired network 304.

The primary SOM 310 may include a plurality of data ports 312, a data port 313, a data port 314, a processor 316, a volatile memory 318, and a non-volatile memory 319. According to the present example, each of the data ports 312, 314, and 314 is an Ethernet port. However, alternative implementations are possible in which any of the data ports 312, 313, and 314 is a different type of port, such as a USB port, or a parallel data port, etc. The processor 316 may include one or more of a general-purpose processor (e.g., an ARM-based processor, a RISC processor, an x86 processor, etc.), a special-purpose processor, an Application-Specific Integrated Circuit (ASIC), a Field-Programmable Gate Array (FPGA), and/or any other suitable type of processing circuitry. The volatile memory 318 may include any suitable type of volatile memory, such as synchronous dynamic random-access memory (SDRAM) for example. The non-volatile memory 319 may include any suitable type of non-volatile memory, such as electrically erasable programmable read-only memory (EEPROM), a hard disk (HD), a solid-state drive (SSD), or a non-volatile random-access memory (nvRAM) device, for example.

The secondary SOM 320 may include a port 322, a wireless controller 324, and a plurality of access point (AP) radios 326. According to the present example, the port 322 is an Ethernet port. However, alternative implementations are possible in which the port 322 includes another type of port, such as a USB port or a parallel data port, etc. The wireless controller 324 may include any suitable type of processing circuitry that is configured to transmit/receive data over a wireless network and/or manage access to the wireless network. By way of example, the wireless controller 324 may be configured to perform various access point functions, such as controlling the power and/or respective data rates of wireless channels that are available in the wireless network 302. Additionally or alternatively, in some implementations, the wireless network controller may implement a data-link-layer switch for transmitting data over the wireless network 302. The AP radios 326 may include one or more transceivers for transmitting data over a wireless network.

The data connectors 340 may include any suitable type of electronic circuitry for transmitting and/or receiving data from the wired network 304. In some implementations, the data connectors 340 may include one or more circular connectors 702 (shown in FIG. 7). However, it will be understood that the present disclosure is not limited to using any specific type connector. Although in the example, of FIG. 7 only two circular connectors 702 are depicted, it will be understood that each of the circular connectors may provide multiple Ethernet channels (or links). The antenna connectors 350 may include any suitable type of electronic circuitry for connecting the AP radios 326 to one or more antennas (not shown) that are arranged to transmit and receive data over the wireless network 302. In some implementations, the antenna connectors 350 may include RP-SMA connectors 704 (shown in FIG. 7). However, it will be understood that the present disclosure is not limited to using any suitable type of antenna connector.

The switch 330 may include a network-layer switch that is configured to multiplex some of the channels in the data connectors 340 onto the data port 313. According to the present example, the switch 330 is a gigabit switch. However, it will be understood that the present disclosure is not limited to using any specific type of switch being used in the GR 110. Additionally or alternatively, in some implementations, the switch 330 may be altogether omitted from the GR 110.

According to the example of FIG. 3, the secondary SOM 320 brings access point capabilities to the GR 110, and it may be configured to operate as an access point to the wireless network 302. As such, the secondary SOM 320 may be configured to receive data from the primary SOM 310 and transmit the received data over the wireless network 302. Furthermore, the secondary SOM 320 may be configured to receive data from the wireless network 302 and forward the received data to primary SOM 310 for transmission over the wired network 304. In some implementations, the secondary SOM 320 may encrypt data that is received from the primary SOM 310 before the data is transmitted over the wireless network 302. Furthermore, the secondary SOM 320 may decrypt data that is received over the wireless network 302 before forwarding the received data to the primary SOM 310. The encryption/decryption may be performed using AES and/or any other encryption standard that can be used to secure the traffic in a wireless network.

According to the example of FIG. 3, the primary SOM 310 brings data encryption, data monitoring, and data logging capabilities to the GR 110. As is discussed further below with respect to FIG. 4, the primary SOM 310 may be configured to implement a virtual network including a firewall 412D (shown in FIG. 4) and a Virtual Private Network (VPN) server 412c (also shown in FIG. 4). The firewall 412d may be configured to monitor and log data that is exchanged through the primary SOM 310 between the secondary SOM 320 and the wired network 304. The VPN server 412c may be configured to encrypt user data is provided by the primary SOM 310 to the secondary SOM 320 for transmission over the wireless network. This encryption may be separate from any additional encryption performed by the secondary SOM 320. The VPN server 412c may be further configured to decrypt user data that is received over the wireless network 302 before transmitting the user data over the wired network 304. In some implementations, the VPN server 412c may be arranged to establish a VPN channel between the GR 110 and at least one wireless device that is connected to the wireless network 302.

According to the example of FIG. 3, the primary SOM 310 brings device authentication capabilities to the secondary SOM 320. Specifically, the primary SOM 310 may execute a wireless network authentication server 412e (shown in FIG. 4). The server 412e may be configured to authenticate any wireless devices that attempt to join the wireless network 302 via the secondary SOM 320 (and/or the GR 110). In this regard, in addition to user data that is exchanged between the wireless network 302 and the wired network 304, the primary SOM 310 and the secondary SOM 320 may also exchange communications that are used to validate the identity of devices (or users) that attempt to use the secondary SOM 320 (and/or GR 110) as an access point for connecting to the wireless network 302. In some implementations, the communications that are used to validate the identity of devices (or users) that attempt to connect to the wireless network 302 may be formatted in accordance with the Remote Authentication Dial-In User Service (RADIUS) protocol. However, it will be understood that the present disclosure is not limited to using any specific protocol for controlling access to the wireless network 302.

In some implementations, all communication between the primary SOM 310 and the secondary SOM 320 may be performed over an Ethernet connection that is established between data ports 314 and 322. As can be readily appreciated, in some implementations, the data ports 314 and 322 may be used to transmit (both user data and communications for validating the identity of devices (or users) that attempt to join the wireless network 302. In some implementations, the data ports 314 and 322 may be the only means for the exchange of data between the primary SOM 310 and the secondary SOM 320. Limiting the number of communications paths between the primary SOM 310 and the secondary SOM 320 is advantageous because it reduces the pathways along which an intrusion into the wireless network 203 (or the secondary SOM 320) could spread into the primary SOM 310 (and/or the wired network 304).

In some implementations, using different SOMs to implement the access point capabilities of the GR 110 and the wireless network device authentication capabilities of the GR 110 is advantageous because it could bolster the security of the GR 110. Under the arrangement shown in FIG. 3, the wireless network authentication server 412e is executed in non-shared memory with the secondary SOM 320, thus making it less likely for any intrusion into the wireless network 302 (and/or secondary SOM 320) to compromise the authentication mechanisms that are used by the wireless network 302.

Figure 4:
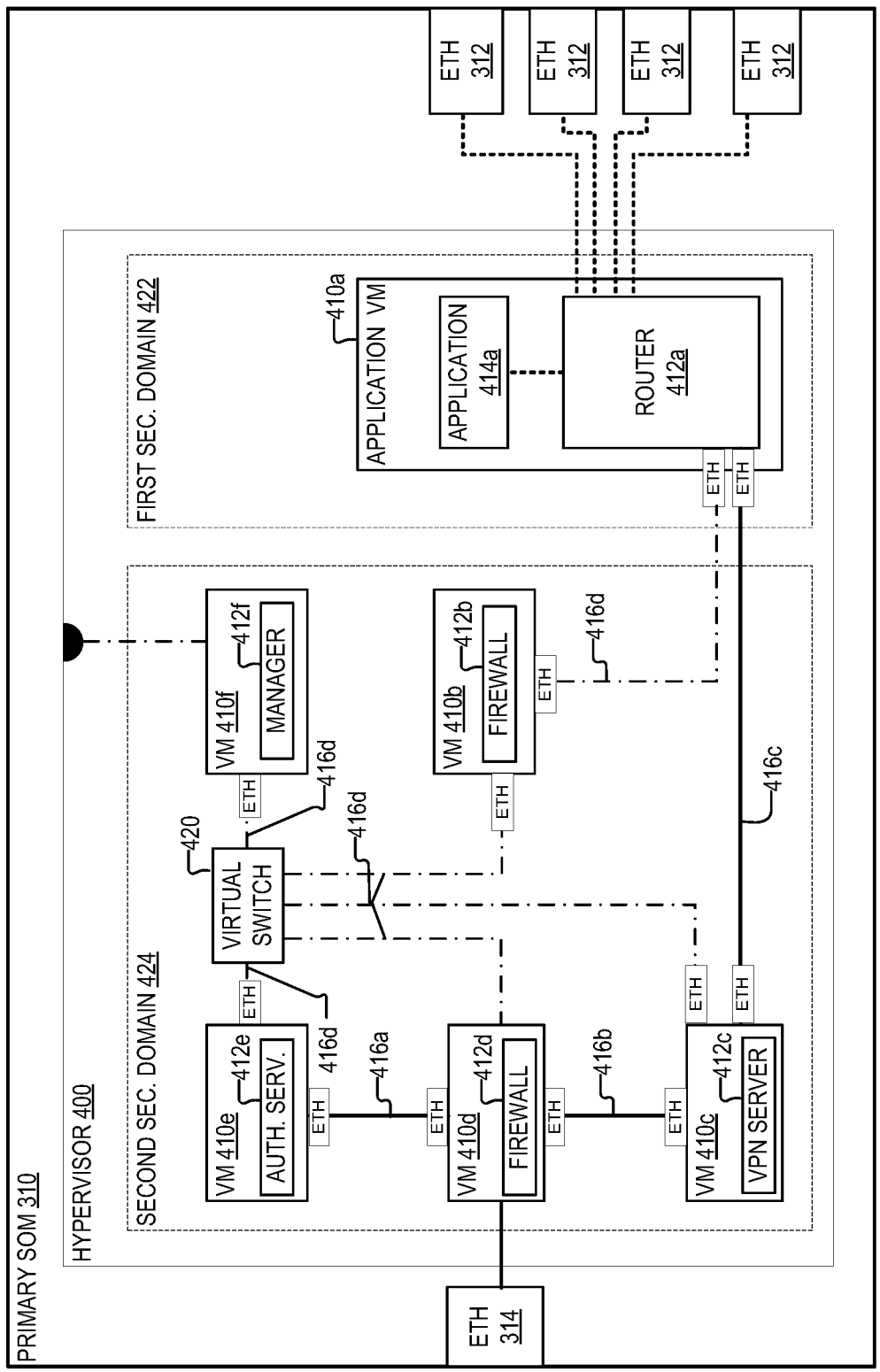
FIG. 4 is a schematic diagram of an example of a primary system-on-a module (SOM) that is part of the GR of FIG. 3, according to aspects of the disclosure.

FIG. 4 is a diagram of the primary SOM 310, according to aspects of the disclosure. The primary SOM 310 (or processor 316) may be configured to execute a hypervisor 400. The hypervisor 400 may be configured to execute virtual machines 410e-f, as shown.

The virtual machine 410a may be configured to execute a router application 412a (herein router 412a) and one or more user applications 414a. The user application 414a may include any suitable type of application, such as a video tracking application, or a medical application, for example. In some implementations, the user application 414a may be omitted from the virtual machine 410a.

The router 412a may receive any packets that enter the primary SOM 310 through one of the data ports 312. Afterwards, the router 412a may route the received packets to one of: (A) the virtual machine 410B (and/or firewall 412b) and (B) the virtual machine 410c (and/or VPN server 412c). Specifically, the router 412a may route to the virtual machine 410c (and/or VPN server 412c) all packets that are designated for devices in the wireless network 302. On the other hand, the router 412a may route to the virtual machine 410b (and/or firewall 412b) any packets that are designated for any of the virtual machines 410b-f (and/or applications 412b-f). In some implementations, any packet that is designated for a device in the wireless network 302 may include an address of the device in its destination field. In some implementations, any packet that is designated for one of the virtual machines 410b-f may have an address of the virtual machine in its destination field. Packets that are designated for devices in the wireless network 302 are provided to the secondary SOM 320 for transmission over the wireless network 302. Packets that are designated for any of the virtual machines 410B-F are processed internally in the primary SOM 310. Such packets may be used as a basis for performing software updates and/or configuration changes on any of the virtual machines 410b-f and/or applications 412b-f. Furthermore, such packets may be used for updating and/or changing one or more configuration settings of the hypervisor 400.

According to the present disclosure, performing configuration changes and/or software updates on any of the virtual machines 310b-f and/or applications 412b-f is referred to as "performing maintenance" on the virtual machines or applications. Similarly, performing configuration changes and/or software updates on the hypervisor 400 is referred to as "performing maintenance" on the hypervisor 400. Any data that is used as a basis for performing maintenance on any of the hypervisor 400, the virtual machines 410b-f and/or applications 412b-f is herein referred to as maintenance data. For example, the term "maintenance data" may refer to an instruction to perform a software update or change a configuration setting of one of the virtual machines 410a-f and/or applications 412a-f As another example, the term "maintenance data" may refer to the payload of the instruction (e.g., a software update file or the new value of the configuration setting, etc.).

The virtual machine 410b may be configured to execute a firewall application 412b (hereinafter firewall 412b). The firewall 412b may be configured to monitor data traffic (e.g., one or more data packets) that is designated for the virtual machine 410*f* (and/or manager 412*f*). As used throughout the disclosure, the phrase "monitoring data traffic" may refer to filtering the traffic, logging the traffic, and/or performing any other suitable action that is customarily performed by firewalls.

The firewall 412*b* may forward any traffic that is received at the firewall 412*b* to a virtual switch 420 (and/or manager 412*f*). The virtual switch 420 may be implemented as part of the hypervisor 400 or in a separate virtual machine (not shown). The virtual switch 420 may be configured to forward data traffic that is received from the firewall 412*b* to the virtual machine 410*f* (and/or manager 412*f*). Furthermore, the virtual switch 420 may be configured to forward data traffic originating from the virtual machine 410*f* (and/or manager 412*f*) to any of the virtual machines 410*b-e* and/or applications 410*b-e*. Although in the present example, the virtual switch 420 is configured to route all traffic received from the firewall 412*b* to the manager 412*f*, alternative implementations are possible in which the virtual switch 420 routes traffic received from the firewall 412*b* to any of the virtual machines 410*b-f* and/or applications 412*b-f*.

The virtual machine 410*f* may be configured to execute a manager application 412*f* (hereinafter "manager 412*f*"). In some implementations, the manager 412*f* may be configured to receive maintenance data that is input into the GR 110. The maintenance data may be received from a maintenance terminal, such as the maintenance terminal 134, which is shown in FIG. 1. In some implementations, based on the maintenance data, the manager 412*f* may perform a software update on any of the virtual machines 410*b-f* and/or applications 412*b-f*. Additionally or alternatively, based on the maintenance data, the manager 412*f* may change one or more configuration settings of any one of the virtual machines 410*b-f* and/or applications 412*b-f*. Additionally or alternatively, based on the maintenance data, the manager 412*f* may change one or more configuration settings of the hypervisor 400. In some implementations, the manager 412*f* may be configured to authenticate the maintenance terminal and/or maintenance data and use the maintenance data only when the maintenance terminal and/or maintenance data has been authenticated successfully.

In some implementations, only the manager 412*f* may interact directly with the maintenance terminal, and any of the virtual machines 410*a-e* and/or applications 412*a-e* may interact with the maintenance terminal indirectly, through the manager 412*f*. In such implementations, all maintenance data that is input into the primary SOM 310 may be received at the manager 412*f*. In other words, among all components of the primary SOM 310 that are disposed between the virtual machine 410*a* (and/or router 412*a*) and the secondary SOM 320, only the manager 412*f* may receive maintenance data. Centralizing the transmission of maintenance data in this manner is advantageous because it may increase the security of the primary SOM 310 and/or GR 110. The maintenance data, as noted above, may include an instruction to perform a software update or change a configuration setting of a specified one of the virtual machines 410*a-f* and/or applications 412*a-f*. The manager 412*f* may communicate directly with the specified one of the virtual machines 410*b-e* and/or applications 412*b-e* to execute the instruction. In some implementations, the manager 412*f* may use the secure shell (SSH) protocol to communicate with the specified one of the virtual machines 410*b-e* and/or applications 412*b-e* to execute the instruction. The "specified" one of the virtual machines 410*a-f* and/or applications 412*a-f* may be any of the virtual machines 410*a-e* and/or applications 412*a-e*. In some implementations, the manager 412*f* may receive the maintenance data via a web interface that is provided by the manager 412*f* and/or another component of the primary SOM 310.

The virtual machine 410*c* may be configured to execute a VPN server 412*c*. The VPN server 412*c* may be configured to establish or maintain one or more VPN channels between GR 110 and devices in the wireless network 302. More particularly, the VPN server 412*c* may be configured to receive (from the router 312*a*) packets that are designated for one or more devices in the wireless network 302. Next, the VPN server 412*c* may encrypt the received packets to produce encrypted packets. And finally, the VPN server 412*c* may provide the encrypted packets to the virtual machine 410*d* (and/or firewall 412*d*).

The virtual machine 410*d* may be configured to execute a firewall application 412*d* (hereinafter firewall 412*d*). The firewall 412*d* may be configured to monitor data traffic (e.g., one or more data packets) that is designated for one or more devices in the wireless network 302. In operation, the firewall 412*d* may receive encrypted packets from the VPN server 312*c* and output the received packets (if they are not blocked) on data port 314, thus causing the packets to be received at the secondary SOM 320. The secondary SOM 320 may then transmit the encrypted packets over the wireless network 302 in a well-known fashion.

Stated succinctly, data that is received at the GR 110 from the wired network 304 may travel across the primary SOM 310 along two data paths. Specifically, packets that are received from the wired network 304, and which are designated for devices in the wireless network 302, may pass through the router 412*a*, the VPN server 412C, and the firewall 412*d*. On the other hand, packets that are designated for one of the virtual machines 410*b-f* and/or applications 412*b-f* may pass through the router 412*a* and the virtual switch 420 before they reach their final destination. Under the nomenclature of the present disclosure, any device that is connected directly or indirectly to one of the data ports 312 of the GR 110 is considered to be part of the wired network 304.

In some implementations, when maintenance is performed on any of the virtual machines 410*b-f* and/or applications 412*b-f*, data that is generated by the virtual machines 410*b-f* and/or applications 412*b-f* (over the course of performing the maintenance) may be transmitted back to the maintenance terminal that is overseeing the maintenance. Such data may pass through the virtual switch 420 and the router 412*a* before it is transmitted over the wired network 304 (via one of the data ports 312). In other words, the firewall 412*b* may be configured to monitor data that originates from any of the virtual machines 410*b-f* (and/or applications 412*b-f*), over the course of performing maintenance, and forward the data to the router 412*a*. As can be readily appreciated, in some implementations, the firewall 412*b* may be dedicated to monitoring maintenance data that is transmitted to the manager 412*f* and/or data that that is generated, by one of the virtual machines 410*a-f* (and/or applications 412*a-f*) in response to the maintenance data. In such implementations, the firewall 412*b* may not receive any user data that is being exchanged between networks 302 and 304 via the GR 110. The router 412*a* may then route the data to one of the data ports 312 for transmission over the wired network 304.

In some implementations, when the secondary SOM 320 receives data over the wireless network 302, the secondary SOM 320 may provide the received data to the primary SOM 310, and the primary SOM 310 may transmit the received data over the wired network 304. In such situations, the data (received from the wireless network 302) may pass through the firewall 412d, the VPN server 412c, and the router 412a before it is forwarded to its final destination (in the wired network 304) via one of the data ports 312. More particularly, the firewall 412d may monitor data that is received from the secondary SOM 320 (on data port 314) and forward the received data (provided that it is not blocked) to the VPN server 412c. The VPN server 412c may decrypt data that is received from the firewall 412d and forward the decrypted data to the router 412a. And the router 412a may route the decrypted data to one of the data ports 312 for transmission over the wired network 304.

The virtual machine 410e may be configured to execute a wireless network authentication server 412e. According to the present example, the server 412e is a RADIUS server, and it may be arranged to provide centralized authentication, authorization, and management services for the wireless network 302. As noted above, the server 412e may be configured to authenticate devices that attempt to connect to the wireless network 302. In this regard, when a device attempts to connect to the wireless network 302, the device may provide an authentication credential (e.g., a PKI certificate) to the secondary SOM 320. The secondary SOM 320 may transmit the authentication credential (via port 322) to the primary SOM 310. When the credential arrives at the primary SOM 310, the credential may first stop at the firewall 412d (via data port 314). Afterwards, the firewall 412d may forward the credential to the server 412e. The server 412e may attempt to authenticate the credential, after which the server 412e may generate a response indicating whether the credential is valid. The firewall 412d may receive the response from the server 412e and forward the response to the secondary SOM 320. If the response indicates that the credential is valid, the secondary SOM 320 may permit the device to connect to the wireless network 302. Otherwise, if the response indicates that the credential is invalid, the secondary SOM 320 may deny the attempt to connect to the wireless network 302.

According to the example of FIG. 4, each of the virtual machines 410b-f is executed in the volatile memory 318 of the primary SOM 310, and its state is not persisted on the non-volatile memory 319 (or in any other non-volatile memory). In other words, under the present arrangement, each of the virtual machines is fully contained in the volatile memory 318. More particularly, under the present arrangement, no state information of any of the virtual machines 410b-f and/or applications 412b-d is preserved after the GR is power-cycled (i.e., powered off and then powered on again). This arrangement is advantageous because it permits any intrusions into the primary SOM 310 to be interrupted by simply power-cycling the GR 110. As can be readily appreciated, power-cycling the GR 110 would cause any malicious code (or other malicious data) to be destroyed when the GR 110 is power cycled. Moreover, power-cycling the GR 110 would cause the GR 110 to return to a default state in which the security of the GR 110 is fully intact.

According to the example of FIG. 4, each of the virtual machines 410a-f may be a lightweight virtual machine having a memory footprint of less than 32 MB. In some respects, reducing the memory footprint of each of the virtual machines 410a-f may allow the GR 110 to be power-cycled in less than 1 minute. In other words, the use of small-footprint virtual machines that are stored in volatile memory only allows the GR 110 to recover from cyber attacks in less than 1 minute. This is in contrast to some similar conventional systems, which may take days to recover.

According to the example of FIG. 4, none of the virtual machines 410b-f may be configured (and/or permitted) to access the non-volatile memory 319. Moreover, according to the example of FIG. 4, only the virtual machine 410a (out of virtual machines 410a-f) may be configured (and/or permitted) to read and write data to the non-volatile memory 319.

According to the example of FIG. 4, the virtual machines 410a-f and/or applications 412a-f may be connected to one another via virtual Ethernet links 416, which are provided by the hypervisor 400. In some respects, the Ethernet links 416a, 416b, and 416c may form a first virtual network that is used for connecting the wireless network 302 and the wired network 304 to one another. Moreover, the link 416d may form a second virtual network that is used for maintenance of the primary SOM 310. In some implementations, the first virtual network may be used to carry data that crosses the primary SOM 310 En route to the wireless network 302 or wired network 304. By contrast, the second virtual network may be used to carry maintenance data. In some respects, link 416c may be configured to transmit unencrypted data; link 416b may be configured to carry data that has been encrypted by the VPN server 412c; link 416a may be configured to carry authentication data (e.g., data that is formatted in accordance with the RADIUS protocol); and links 416d may be configured to carry maintenance data.

In some respects, the virtual machine 410a (and/or applications 412a and 414a) may be part of a first security domain 422 of the primary SOM 310 and the virtual machines 410b-f (and/or applications may be part of a second security domain 424 of the primary SOM 310. As discussed above, the second security domain 424 may be separated from the secondary SOM 320 (and/or wireless network 302) by firewall 412d. In addition, the second security domain 424 may also be separated from the first security domain 422 by firewall 412b. In some respects, the use of firewalls to monitor all egress and ingress into the second security domain 424 can prevent any intrusions into one of the wireless network 302 (and/or secondary SOM 320) and the first security domain 422 from spreading into the second security domain 424 of the primary SOM 310. In some respects, the second security domain 424 may be operable to contain any malicious code (or other data) that enters the GR 110 through one of the wireless network 302 and the wired network 304.

Figure 5:
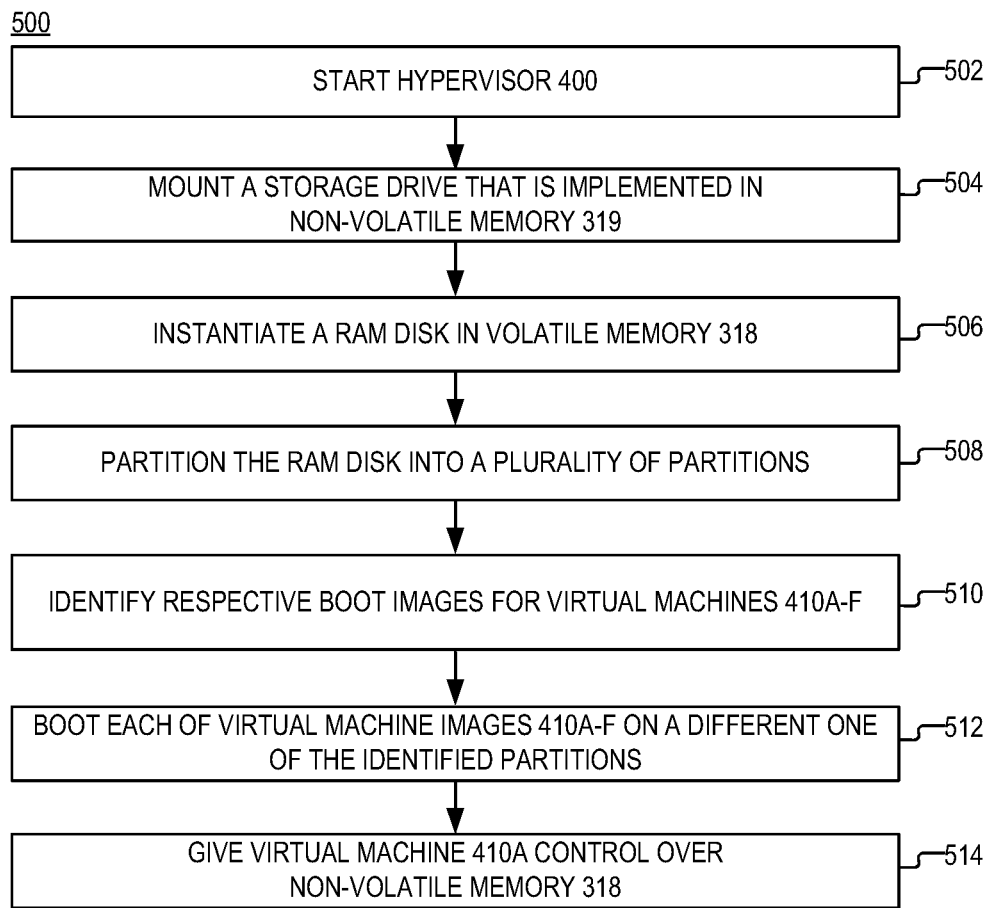
FIG. 5 is flowchart of an example of a process that is performed by the GR of FIG. 3, according to aspects of the disclosure.

FIG. 5 is a flowchart of an example of a process 500 that is performed by the primary SOM 310, according to aspects of the disclosure. At step 502, a boot loader of the primary SOM 310 starts the hypervisor 400. At step 504, the hypervisor 400 mounts a storage drive that is implemented in the non-volatile memory 319. At step 506, the hypervisor 400 instantiates a random-access memory (RAM) disk in the volatile memory 318. At step 508, the hypervisor 400 partitions the RAM disk into a plurality of disk partitions. Each of the partitions may include a different respective-.ext2/4 file system and/or any other suitable type of file system instance. The RAM disk may include any suitable type of virtual drive that is instantiated in volatile memory.

At step 510, the hypervisor 400 identifies a plurality of virtual machine boot images that are stored in the storage drive that is mounted at step 504). According to the present example, each of the virtual machine images may be an image of a different one of the virtual machines 410a-f (and/or applications 412a-f). At step 512, the hypervisor 400 boots each of the virtual machine images on a different one of the RAM disk partitions (obtained at step 508). As a result of executing step 512, each of the virtual machines 410a-e begins executing on a different RAM disk partition. At step 514, the hypervisor 400 gives the virtual machine 410a control over the non-volatile memory 319 or the storage device that is implemented in the non-volatile memory 319. Giving control over the non-volatile memory 319 may include changing one or more configuration settings of the hypervisor to allow the virtual machine 410a to read and write data to the non-volatile memory 319 (or storage drive that is implemented on the non-volatile memory 319). Additionally or alternatively, giving control over the non-volatile memory 319 may include providing the virtual machine 410a with an address (e.g., a PCI address) of the non-volatile memory 319 and/or any other information that is needed (by the virtual machine 410a) to access the non-volatile memory 319.

Figure 6:
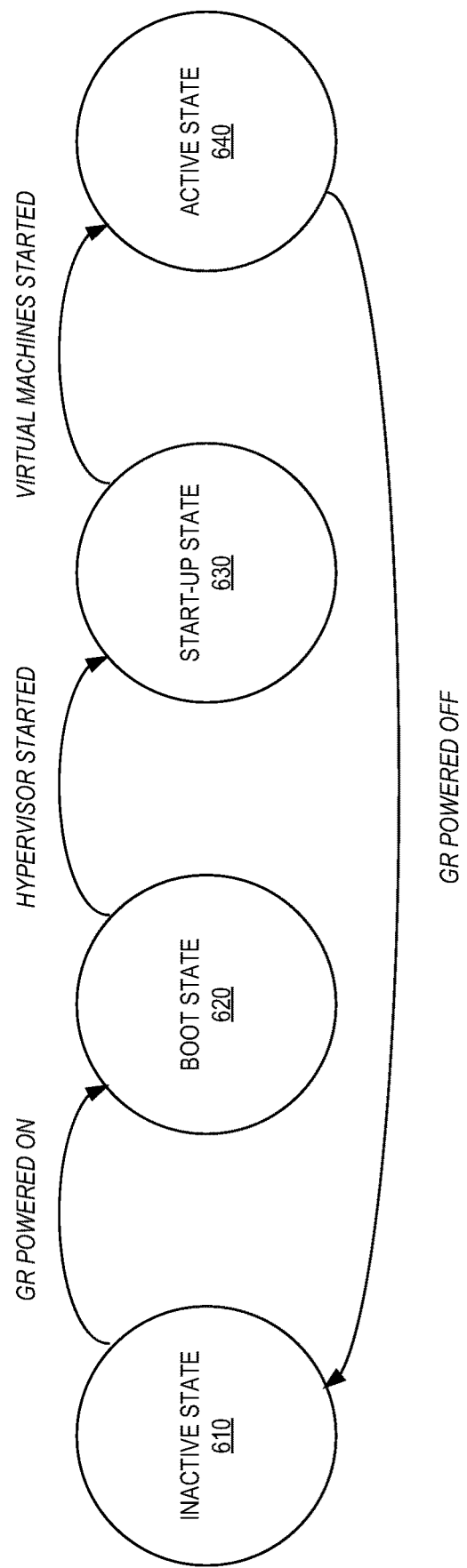
FIG. 6 is a state diagram illustrating a set of operational states of the GR of FIG. 3, according to aspects of the disclosure.

FIG. 6 is a state diagram illustrating aspects of the operation of the GR 110. As illustrated, throughout its operation, the GR 110 may be in one of an inactive state 610, a boot state 620, a start-up state 630, and an active state 640.

When the GR 110 is in the boot state, the GR 110 may be powered off or otherwise inoperative. The GR 110 may exit the inactive state 610 and transition to the boot state 620 when the GR 110 is powered on or otherwise turned on.

Upon entering the boot state 620, a bootloader of the GR 110 may start the hypervisor 400. Next, the hypervisor 400 may instantiate a RAM disk in the volatile memory 318. After the RAM disk is instantiated, the GR 110 may transition into the start-up state 630.

Upon entering the start-up state 630, the hypervisor 400 may partition the RAM disk into a plurality of partitions. As noted above, each partition may have a separate file system. Next, the hypervisor 400 may boot each of the virtual machines 410a-f on a different one of the partitions. After each of the virtual machines 410 is booted, the GR 110 may transition into the active state 640.

When the GR 110 is in the active state 640, the GR 110 may route data traffic from the wireless network 302 to the wired network 304, and vice versa. The GR 110 may transition out of the operating state 640 and back into the inactive state 610 when the GR 110 is powered off. When the GR 110 is powered off, all data that is stored in the RAM disk partitions will be destroyed, causing the reversal of any intrusions into one or more of the virtual machines 410a-e.

Figure 7:
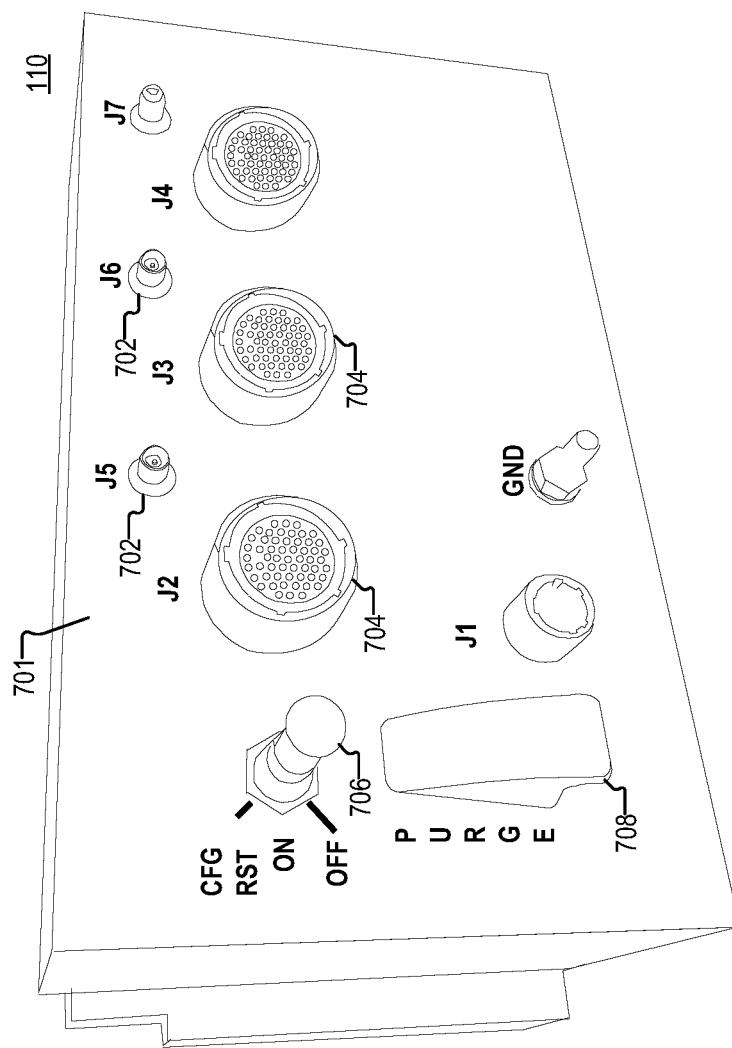
FIG. 7 is a perspective side view of the GR of FIG. 3, according to aspects of the disclosure.

FIG. 7 shows a perspective side view of the GR 110 according to aspects of the disclosure. As illustrated, the GR 110 may include a housing 701, a plurality of connectors 702, a plurality of connectors 704, a power switch 706, and a purge switch 708. As noted above, each of the connectors 702 may be arranged to connect the GR 110 to an antenna for transmitting and receiving data over the wireless network 302. Each of the connectors 704 may be arranged to connect to one or more Ethernet lines. The power switch 706 may be arranged to power the GR 110 on and off, as well as restart the GR 110. The purge switch 708 may be configured to erase all contents of the volatile memory 318 when activated. In some implementations, upon detecting the purge switch 708 is activated, the GR 110 may cut all supply of power to the volatile memory 318, thereby causing the partitions used to execute the virtual machines 410 to be destroyed. As noted above, destroying the partitions may cause all code that is used to execute the virtual machines to be deleted. Additionally or alternatively, in some implementations, upon detecting the purge switch 708 is activated, the GR 110 may execute a series of overwrite sequences on all volatile and non-volatile memories to render them unrecoverable. In other words, executing the series of overwrite sequences may prevent data of any of the virtual machines 410a-f (and/or applications 412a-f) from being recovered from the volatile memory 318.

In some implementations, the housing 701 may have the dimensions of 9.5 in×5.5 in×5 in. In this respect, FIG. 7 is provided to illustrate that the GR 110 (in some implementations) can be a small form factor, rugged, tactical computer that integrates all of the security applications and server capabilities that are typically met by an entire data center. Instead of racks of servers and infrastructure components that are typically required to serve hundreds or thousands of users at the enterprise level, the GR 110 may provide all of these capabilities to tens of users in a ground vehicle or aviation environment. In some respects, the switch 330 may be a 10-port gigabit Ethernet switch. Furthermore, the GR 110 may operate as a 5-port router, a dual authentication server, a secure wireless access point, a firewall, an intrusion detection system, and a software appliance (e.g., see user application 114a)—while having a relatively small footprint in comparison to similar systems. In some respects, the small form-factor of the GR 110 is achieved by using virtualization to implement different components of the first security domain 422 and the second security domain 424 of the primary SOM 310. Although the GR 110 is described as suitable for use in mobile environments, it will be understood that the GR 110 may also be used in more traditional settings where WiFi routers are used, such as wireless networks of university campuses and office buildings for example.

In some implementations, each of the primary SOM 310 and the secondary SOM 320 may be implemented as a separate integrated circuit (e.g., chip), and they may be mounted on the same circuit board. Additionally or alternatively, in some implementations, the primary SOM 310 and the secondary SOM 320 may be implemented as separate circuit boards that are coupled to one another. Stated succinctly, the present disclosure is not limited to any specific implementation of the primary SOM 310 and the secondary SOM 320.

Although in the example of FIG. 4 the virtual machines 410a-f and/or applications 412a-f are connected to one another via Ethernet data links, it will be understood that the present disclosure is not limited to any specific method for connecting the virtual machines 410a-f and/or applications 412a-f to one another. Throughout the disclosure the term "application" is used to refer to any of the router 412a, the firewall 412b, the VPN server 412c, the firewall 412d, the wireless network authentication server 412e, and the manager 412e. However, it will be understood that the use of this term is in no way intended to imply a specific architecture for the virtual machines 412a-f and/or applications 412a-f. For example, in some implementations, any of the router 412a, the firewall 412b, the VPN server 412c, the firewall 412d, the wireless network authentication server 412e, and the manager 412e may be integrated into its respective virtual machine (e.g., as part of a kernel of the virtual machine). As another example, any of the router 412a, the firewall 412b, the VPN server 412c, the firewall 412d, the wireless network authentication server 412e, and the manager 412e may be provided separately of its virtual machine (e.g., as part of a service or user application that is executed on top of a kernel of the virtual machine). Stated succinctly, the present disclosure is not limited to any specific implementation of the virtual machines 410a-f and/or applications 412a-f.

According to the example of FIG. 3, the wireless network 302 is the same or similar to any of the wireless networks 120 and 220, which are shown in FIGS. 1 and 2, respectively. In this regard, it will be understood that the present disclosure is not limited to any specific implementation of the wireless network 302. According to the example of FIG. 3, the wired network 304 is the same or similar to any of the wired networks 130 and 230, which are shown in FIGS. 1 and 2, respectively. In this regard, it will be understood that the present disclosure is not limited to any specific implementation of the wired network 304. According to the example of FIG. 4, the hypervisor 400 is a bare metal hypervisor. However, alternative implementations are possible in which the hypervisor 400 is a hosted hypervisor. Stated succinctly, it will be understood that the present disclosure is not limited to any specific implementations of the hypervisor.

According to the example of FIG. 3 each of the virtual machines 410a-b includes a custom-built Linux distribution image that includes as few services as possible. Each of the applications 412a-b is executed as part of (or on top) of the Linux kernel of its respective virtual machine. However, as noted above, the present disclosure is not limited to any specific implementation of the virtual machines 410a-f and/or applications 412a-f.

The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. An apparatus, comprising:
   a volatile memory;
   a non-volatile memory;
   a first electronic circuit that is configured to operate as a wireless access point, the first electronic circuit including a wireless controller for accessing a wireless network; and
   a second electronic circuit that is operatively coupled via a wired connection to the first electronic circuit, the second electronic circuit including at least one processor configured to execute: (i) a first virtual machine that includes a wireless network authentication server, and (ii) a second virtual machine that includes a virtual private network (VPN) server,
   wherein the wireless network authentication server is configured to authenticate devices that attempt to join the wireless network;
   wherein the VPN server is arranged to encrypt data that is received at the apparatus to produce encrypted data, and forward the encrypted data to the wireless controller for transmission over the wireless network, and
   wherein at least one of the first virtual machine or the second virtual machine is fully contained in the volatile memory.

2. The apparatus of claim 1, wherein the first electronic circuit and the second electronic circuit are coupled to one another via an Ethernet connection, and the encrypted data is forwarded to the second electronic circuit via the Ethernet connection.

3. The apparatus of claim 1, wherein the first virtual machine is executed in a first partition that is instantiated in the volatile memory, and the second virtual machine is executed in a second partition that is instantiated in the volatile memory, each of the first partition and the second partition having a separate file system.

4. The apparatus of claim 1, wherein the processor is further configured to execute a hypervisor, the hypervisor being arranged to perform the operations of:
   instantiating a random-access memory (RAM) disk in the volatile memory;
   partitioning the RAM disk into a plurality of partitions; and
   launching each of the first virtual machine and the second virtual machine on a different one of the plurality of partitions.

5. The apparatus of claim 1, wherein the first electronic circuit includes a first system-on-a-module (SOM) and the second electronic circuit includes a second SOM.

6. The apparatus of claim 1, wherein the processor is further configured to execute a third virtual machine, the third virtual machine including a firewall that is interposed between the VPN server and the wireless controller, the firewall being configured to monitor data traffic between the VPN server and the wireless controller.

7. The apparatus of claim 1, wherein the processor is further configured to execute a third virtual machine, the third virtual machine including a manager application, the manager application being arranged to change a configuration setting of at least one of the VPN server and the wireless network authentication server based on maintenance data that is received at the apparatus.

8. The apparatus of claim 7, wherein the processor is further configured to execute a fourth virtual machine, the fourth virtual machine including a router, the router being arranged to route data that is received at the apparatus to one of the manager application, external Ethernet ports, and the VPN server.

9. The apparatus of claim 7, wherein the first electronic circuit includes a first system-on-a-module (SOM) and the second electronic circuit includes a second SOM, the second SOM being configured to implement a first virtual network and a second virtual network, the first virtual network being arranged to forward user data to the first SOM, and the second virtual network being arranged to forward maintenance data to the manager application.

10. A method for use in an electronic device that includes a first electronic circuit configured to operate as an access point for accessing a wireless network and a second electronic circuit coupled via wired connection to the first electronic circuit and having a volatile memory and at least one processor, the method comprising:
instantiating a random-access memory (RAM) disk in the volatile memory of the second electronic circuit;
partitioning the RAM disk into a plurality of partitions;
launching a first virtual machine on the second electronic circuit, the first virtual machine being launched in a first partition of the RAM disk, the first virtual machine including a wireless network authentication server that is configured to authenticate devices that attempt to join the wireless network via the first electronic circuit; and
launching a second virtual machine on the second electronic circuit, the second virtual machine being launched in a second partition of the RAM disk, the second virtual machine including a virtual private network (VPN) server that is configured to encrypt data that is received at the apparatus to produce encrypted data, and forward the encrypted data to the first electronic circuit for transmission over the wireless network,
wherein the first virtual machine and the second virtual machine are fully contained in the volatile memory of the second electronic circuit.

11. The method of claim 10, further comprising:
detecting that a purge switch of the electronic device is activated; and
executing one or more overwrite sequences on the volatile memory of the second electronic circuit to render data of the authentication server and the VPN server unrecoverable.

12. The method of claim 10, further comprising:
launching a hypervisor on the second electronic circuit when the electronic device is booted,
wherein the RAM disk is instantiated and partitioned by the hypervisor, and
wherein the first virtual machine and the second virtual machine are launched by the hypervisor.

13. The method of claim 10, further comprising launching a third virtual machine on the second electronic circuit, the third virtual machine being launched in a third partition of the RAM disk, the third virtual machine including a manager application, the manager application being arranged to change a configuration setting of at least one of the VPN server and the wireless network authentication server based on maintenance data that is received at the electronic device.

14. The method of claim 13, further comprising launching a fourth virtual machine on the second electronic circuit, the fourth virtual machine being launched in a fourth partition of the RAM disk, the fourth virtual machine including a router configured to route data that is received at the apparatus to one of the manager application, external Ethernet ports, and the VPN server.

* * * * *